United States Patent [19]

Yamada et al.

[11] Patent Number: 4,958,239

[45] Date of Patent: Sep. 18, 1990

[54] METHOD OF GRADATION AND SELECTION OF MICRO PICTURE ELEMENTS THEREFOR IN A PICTURE DISPLAY

[75] Inventors: Kunio Yamada; Shigeru Tsukada; Masao Seki, all of Kanagawa, Japan

[73] Assignee: Fuji Xerox Co., Ltd., Tokyo, Japan

[21] Appl. No.: 313,416

[22] Filed: Feb. 22, 1989

[30] Foreign Application Priority Data

Feb. 25, 1988 [JP]  Japan ................... 63-43101

[51] Int. Cl.⁵ ............................................. G03F 3/08
[52] U.S. Cl. ..................................... 358/457; 358/458
[58] Field of Search ................................ 358/457, 458

[56] References Cited

U.S. PATENT DOCUMENTS 4,752,822  6/1988  Kawamura ..................... 358/457

OTHER PUBLICATIONS

*Image Processing Handbook,* Image Processing Handbook Editing Commission, Editors, Published by Shokodo Co., Ltd., Jun. 8, 1987, pp. 75–76.

Primary Examiner—James J. Groody
Assistant Examiner—Mark R. Powell
Attorney, Agent, or Firm—Finnegan, Henderson, Farabow, Garrett and Dunner

[57] ABSTRACT

A method of gradation and selection of micro picture elements in a picture display where the picture is reproduced as a plurality of dots each corresponding to a picture element comprised of a plurality of micro picture elements. Each picture element is shaped and the gradation selected such that the number of colored micro picture elements in point-contact of contiguous picture elements is not larger than two.

2 Claims, 6 Drawing Sheets

| Y \ X | 000 | 001 | 010 | 011 | 100 | 101 |
|---|---|---|---|---|---|---|
| 000 | S7  | S13 | S16 | S17 | S2  | S4  |
| 001 | S11 | S12 | S9  | S10 | S5  | S6  |
| 010 | S18 | S1  | S3  | S8  | S14 | S15 |
| 011 | S17 | S2  | S4  | S7  | S13 | S16 |
| 100 | S10 | S5  | S6  | S11 | S12 | S9  |
| 101 | S8  | S14 | S15 | S18 | S1  | S3  |

FIG. 4(B)

| X | Y | S | A | X | Y | S | A |
|---|---|---|---|---|---|---|---|
| 000 | 011 | S17 | 10001 | 000 | 000 | S7  | 00111 |
| 001 | 011 | S2  | 00010 | 001 | 000 | S13 | 01101 |
| 010 | 011 | S4  | 00100 | 010 | 000 | S16 | 10000 |
| 011 | 011 | S7  | 00111 | 011 | 000 | S17 | 10001 |
| 100 | 011 | S13 | 01101 | 100 | 000 | S2  | 00010 |
| 101 | 011 | S16 | 10000 | 101 | 000 | S4  | 00100 |
| 000 | 100 | S10 | 01010 | 000 | 001 | S11 | 01011 |
| 001 | 100 | S5  | 00101 | 001 | 001 | S12 | 01100 |
| 010 | 100 | S6  | 00110 | 010 | 001 | S9  | 01001 |
| 011 | 100 | S11 | 01011 | 011 | 001 | S10 | 01010 |
| 100 | 100 | S12 | 01100 | 100 | 001 | S5  | 00101 |
| 101 | 100 | S9  | 01001 | 101 | 001 | S6  | 00110 |
| 000 | 101 | S8  | 01000 | 000 | 010 | S18 | 10010 |
| 001 | 101 | S14 | 01110 | 001 | 010 | S1  | 00001 |
| 010 | 101 | S15 | 01111 | 010 | 010 | S3  | 00011 |
| 011 | 101 | S18 | 10010 | 011 | 010 | S8  | 01000 |
| 100 | 101 | S1  | 00001 | 100 | 010 | S14 | 01110 |
| 101 | 101 | S3  | 00011 | 101 | 010 | S15 | 01111 |

| S | S | S | S |
|---|---|---|---|
| S | S | S | S |
| S | S | S | S |
| S | S | S | S |

FIG. 7(A)

| S16 | S15 | S14 | S13 |
|---|---|---|---|
| S5 | S4 | S3 | S12 |
| S6 | S1 | S2 | S11 |
| S7 | S8 | S9 | S10 |

FIG. 7(B)

| S11 | S7 | S10 | S6 |
|---|---|---|---|
| S3 | S15 | S2 | S14 |
| S9 | S5 | S12 | S8 |
| S1 | S13 | S4 | S16 |

FIG. 7(C)

| S10 | S15 | S6 | S2 |
|---|---|---|---|
| S7 | S3 | S11 | S14 |
| S5 | S1 | S9 | S16 |
| S12 | S13 | S8 | S4 |

METHOD OF GRADATION AND SELECTION OF MICRO PICTURE ELEMENTS THEREFOR IN A PICTURE DISPLAY

BACKGROUND OF THE INVENTION

1. Field of the Invention

The present invention relates to a method of gradation display in a picture output apparatus, and particularly relates to a method of displaying gradation in a picture output apparatus in which a picture is divided into picture elements each having a very small area and each of the picture elements is divided into micro picture elements each having a micro area, so that gradation of each picture element is displayed on the basis of the ratio of colored micro picture elements forming a dot to the total number of micro picture elements in the picture element.

2. Description of the Prior Art

Conventional picture output devices such as a duplicator, a printer, a digital copying machine or the like, have implemented a method of artificially displaying gradation in reproducing a picture having gradation. In the method of artificially displaying gradation, a picture is divided into small unit picture elements, so that the gradation is displayed by selectively marking the picture elements dark or light. The method commonly uses regularly arrayed large and small dots as the abovementioned unit picture element.

As such a method using dots, a density pattern method (that is, an area gradation method) has been known. According to this density pattern method, each picture element on a display side (a picture output apparatus side) corresponding to each picture element in an original picture is divided into a plurality of micro picture elements. Some of the micro picture elements, i.e., a predetermined number corresponding to the gradation of the picture element, are selected out of all the micro picture elements in the picture element. The selected micro picture elements are displayed in the colored state with a predetermined color (for example, black). In this method, a dot is formed of the colored micro picture elements in the predetermined number corresponding to the gradation.

Figure 6:
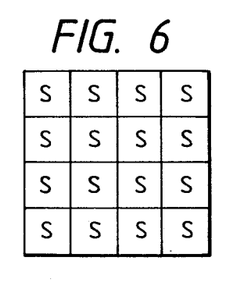
FIG. 6, FIGS. 7(A) to 7(C), and FIGS. 8(A) to 8(C) are diagrams for explaining the prior art method for displaying gradations.

In the above-mentioned density pattern method, it is possible to display gradation in steps corresponding to the number of the micro picture elements constituting each picture element on the display side. For example, assuming that the number of the micro picture elements S constituting each picture element is $4 \times 4 = 16$ as is shown in FIG. 6, and that each micro picture element S performs binary display, then each picture element can be reproduced with one of the gradation levels the total number of which is $(4 \times 4) + 1 = 17$. That is, let the gradation level when all of the micro picture elements S are white be the zero level, let the gradation when only one of the 16 micro picture elements is colored be the first level, let the gradation level when two of the 16 micro picture elements are colored be the second level, ..., and the gradation level when all of the 16 micro picture elements are colored be the sixteenth level. It is possible to display the picture element with one of the seventeen gradation levels. Generally, assuming that the number of micro picture elements constituting each picture element is m, the number of gradation levels which can be displayed is $(m+1)$.

As has been described above, each dot is formed of one or a plurality of colored micro picture elements constituting each picture element, and the gradation of the picture element is determined on the basis of the number of the colored micro picture elements forming the dot. The shape of each dot varies depending on the manner in which the micro picture elements to be colored are selected to form the dot, even if the number of the colored micro picture elements is not changed. Consequently, the quality of a displayed picture may vary depending on the shape of each dot.

The manner for deciding the shape of each dot is an important problem, and various methods therefor have been proposed. The methods may be roughly classified into two methods. A first method uses a font type screen generator, in which various shapes of each dot to be formed by one or a plurality of colored micro picture elements of each picture element are properly set in advance corresponding to the respective gradation levels to be displayed. In this first method, since it is possible to independently establish the shape of each dot for every gradation level, it is easy to produce the optimum shape of each dot. However, a memory is necessary for storing the shapes of each dot corresponding to the number of the gradation levels to be displayed. Thus, the memory must store data that is obtained by multiplying the number of micro picture elements constituting each picture element by the number of gradation levels, and it is therefore necessary to provide a memory having a large capacity.

A second method uses a threshold type screen generator, in which the first of a plurality of micro picture elements constituting each picture element is colored for the first gradation level, the first and second micro picture elements are colored for the second gradation level, ..., and all of the micro picture elements, from the first one to the last one, are colored for the last gradation level. This second method has an advantage in that it requires a small memory capacity because it is possible to produce any one of the patterns of dots corresponding to all the gradation levels if threshold data in the number corresponding to the micro picture elements constituting each picture element are provided. However, since it is impossible to independently establish the shape of each dot for every gradation level, it is difficult to establish the optimum shape of each dot.

In each of the above-mentioned first and second methods, the shape of each dot may vary depending on the manner of selection of the one or more micro picture element(s) to be colored for each gradation level, and the quality of a displayed picture may vary correspondingly.

There have therefore been proposed various kinds of methods of deciding the manner for selection of the one or more micro picture element(s) constituting each picture element be colored for every gradation.

Figure 7A:
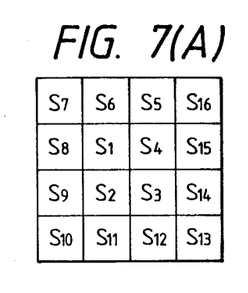
Figure 7B:
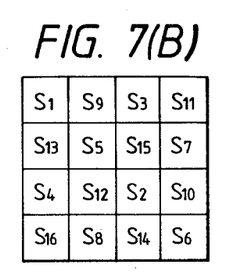
Figure 7C:
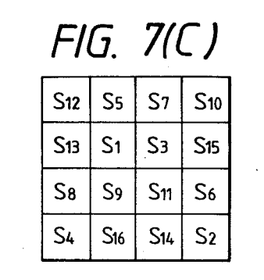

For example, as a method relevant to the above-mentioned second method is disclosed in "Picture Processing Handbook" (edited by the Picture Processing Handbook Editing Commission, published by Shokodo Co., Ltd., June 8, 1987, pages 75 to 76). This reference discloses ways to decide which of the micro picture elements is to be colored, including, for example, to form a spiral shape as shown in FIG. 7(A), to form a Bayer shape as shown in FIG. 7(B), and to form a dot shape as shown in FIG. 7(C). In FIGS. 7(A) to 7(C), each picture element is constituted by a plurality of micro picture elements $S_1$ to $S_{16}$ and the subscripts 1 to 16 of the respective micro picture elements $S_1$ to $S_{16}$ represent the order of coloring the micro picture elements.

The size of the micro picture elements forming dots is generally set near the limit of resolution of a picture output apparatus. If only one micro picture element must be colored to form a dot, or if there is a small projection of a size corresponding to one micro picture element in a group of micro picture elements to be colored to form a dot, it is not easy to reproduce a picture accurately. Consequently, in the case where colored micro picture elements forming a dot are scattered, for example, in the Bayer shape as shown in FIG. 7(B) or the dot shape as shown in FIG. 7(C), there is a problem that the reproducibility of a picture is not stable and the picture quality is apt to deteriorate. If each dot is formed by a mass of colored micro picture elements as in the spiral shape shown in FIG. 7(A), the greater the number of colored micro picture elements, the larger the mass of the colored micro picture elements become, so that the above-mentioned problem is somewhat relieved.

In the above-mentioned spiral method for forming a dot from a mass of colored micro picture elements, however, there is a problem that the reproduction of a picture is unstable for a gradation level of a picture element in which the area ratio of colored micro picture elements to all the micro picture elements constituting the picture element increases to near 50 percent to cause the dot to begin to contact another dot adjacent thereto.

The present invention is based upon the discovery of the inventors that dots adjacent to each other may be kept independent to obtain a relatively stable reproduced picture if there is a distance corresponding to two micro picture elements between the dots adjacent to each other. Moreover, even in the case where dots adjacent to each other are in line-contact with each other, it is possible to obtain a relatively stable reproduced picture. However, if dots adjacent to each other come into point-contact with each other, the reproducibility of a picture becomes suddenly unstable and the picture quality deteriorates.

Figure 8A:
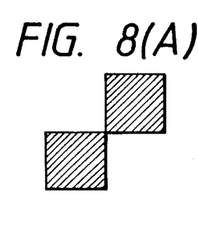
Figure 8B:
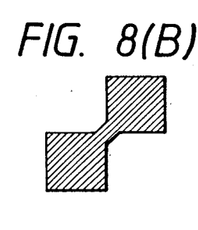
Figure 8C:
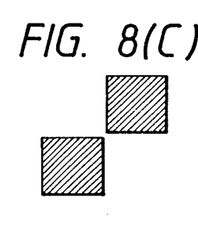

For example, in the case where dots adjacent to each other are in point-contact with each other as shown in FIG. 8(A), there is a tendency that the dots become completely continuous as shown in FIG. 8(B) or become completely separated from each other as shown in FIG. 8(C). Therefore, the reproducibility of a picture becomes so unstable that the granularity becomes low or the accurate gradation display becomes difficult.

In a method of displaying gradation in which each picture element is constituted by a plurality of micro picture elements having a complicated shape other than a rectangular shape (including a square shape), and provided with a screen angle other than 0 degrees and in which the number of selected (colored) micro picture elements of each picture element is set in accordance with the gradation of the picture element to form a dot, it is impossible to avoid dots adjacent to each other from coming into point-contact with each other at any one of the gradation levels.

SUMMARY OF THE INVENTION

An object of the present invention is to solve the foregoing problems of the prior art.

Another object of the present invention is a method of displaying half tone images in a picture output apparatus having picture elements that are arrayed in such a manner that the occurrence of point-contact between dots adjacent to each other cannot be avoided, so that the manner of determining or selecting micro picture elements to be colored to form a dot for every gradation level in each picture element is devised to reduce as much as possible points where dots adjacent to each other come into point-contact with each other in displaying gradation levels of the respective picture elements to thereby improve the picture quality.

These and other objects are accomplished by a picture display method wherein a picture is reproduced as a plurality of dots and each dot is represented by a corresponding picture element having a small area and each of the picture elements is further divided into micro picture elements each having a micro area and wherein a dot is printed as a selected one of a plurality of different gradations wherein each gradation is represented by coloring selected ones of the micro picture elements of the picture element corresponding to the dot, and wherein the method includes the improvement comprising the step of predetermining for every possible gradation of a picture element a pattern of micro picture elements to be colored wherein the number of colored micro picture elements of adjacent dots that are in point-contact with each other is not larger than two.

BRIEF DESCRIPTION OF THE DRAWINGS

The manner by which the above objects and other objects, features, and advantages of the present invention are attained will be apparent from the following description taken in connection with the accompanying drawings, wherein.

DETAILED DESCRIPTION OF THE PREFERRED EMBODIMENT

The method of displaying gradation in a picture output apparatus according to the present invention will be described with reference to the drawings.

Figure 2:
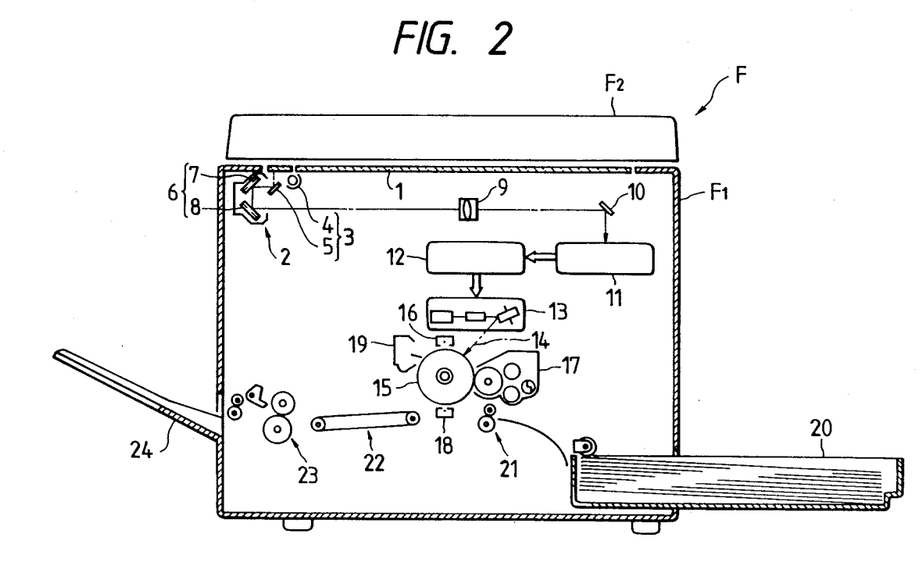
FIG. 2 is an explanatory diagram of the whole of a digital copying machine to which the present invention may be applied.

FIG. 2 is a schematic diagram of a monochrome digital copying machine F to which the present invention may be applied. The monochrome digital copying machine F is constituted by a machine body portion $F_1$ and a cover $F_2$ connected to the upper surface of the machine body portion $F_1$.

The machine body portion $F_1$ is provided, on its upper surface, with a platen (an original document mount) 1 formed of transparent glass. An exposure optical system 2 is disposed under the platen 1. This exposure optical system 2 includes a movable lamp unit 3, and the lamp unit 3 is constituted by integrally provided original document lighting lamp 4 and first mirror 5.

The exposure optical system 2 further includes a movable mirror unit 6 that moves at a speed that is one half of the speed of the lamp unit 3. The movable mirror unit 6 is constituted by a second mirror 7 and a third mirror 8. The above-mentioned exposure optical system 2 further includes a lens 9 and a fourth mirror 10.

During the movement of the lamp unit 3 in the horizontal direction parallel to an original document, the movable mirror unit 6 moves at a speed that is one half of the speed of the lamp unit 3 and travels a distance that is one half of the displacement of the lamp unit 3. The distance between the original document and the lens 9 is kept constant so that the light reflected on the original document irradiated by the lamp 4 is focused onto a picture reading portion 11.

The quantity of the reflected light at every picture element of the original document is converted into an electric signal. This electric signal is supplied to a picture processing portion 12 as density data.

In the picture processing portion 12, the density data is not only converted into an area ratio of a dot, but also converted into binary serial data for every scanning line so that the binary serial data can be outputted as a raster picture from a laser scanner, which will be described later. On the basis of this serial data, a laser light 14 emitted by the laser scanner 13 is turned on or off, so that a picture is written onto a photosensitive surface 15 of a drum.

An electric charger 16, a developing unit 17, a transfer charger 18, a cleaner unit 19 and so on are disposed along the circumferential direction of photosensitive body 15. Moreover, in the above-mentioned machine body portion $F_1$, there are provided a paper storing tray 20, a paper feed mechanism 21 for feeding paper stored in the paper storing tray 20 into the space between the photosensitive body 15 and the transfer charger 18. A conveyer mechanism 22 separates and conveys the paper from the photosensitive body 15 and the transfer charger 18. A fixing unit 23 fixes the image onto the paper and the paper is conveyed by the conveyer mechanism 22 to a paper discharge tray 24.

In this embodiment, each picture element is constituted by 18 micro picture elements $S_1$ to $S_{18}$. Other picture elements adjacent to the picture element under consideration constitute a scanning unit picture element S composed of a matrix of 6×6, i.e., 36 micro picture elements. This scanning unit picture element S is constituted by the 18 micro picture elements $S_1$ to $S_{18}$ of the picture element under consideration and the 18 micro picture elements that are part of the micro picture elements of four surrounding picture elements adjacent to the picture element under construction.

Figure 1:
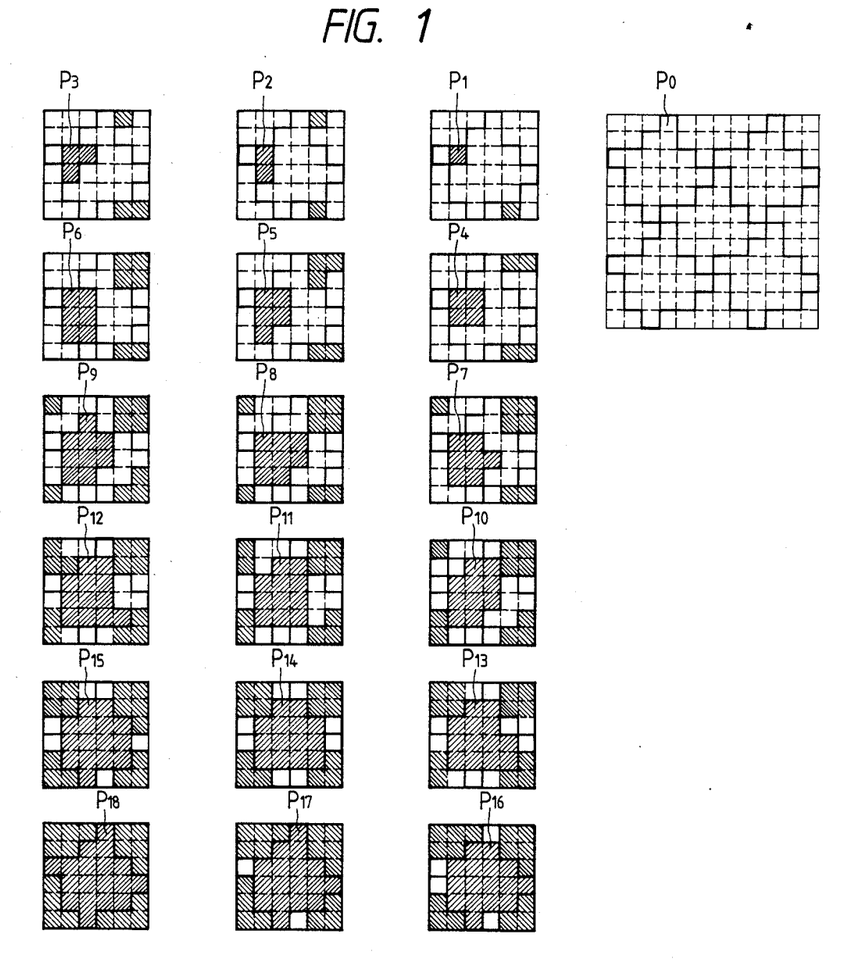
FIG. 1 is an explanatory diagram of a shape of a dot in an embodiment of the method displaying gradation according to the present invention.

FIG. 1 illustrates various kinds of scanning unit picture elements S corresponding to respective gradation levels. Each of the reference symbols $P_0$ to $P_{18}$ in FIG. 1 represents a dot for one picture element and the dots $P_0$ to $P_{18}$ correspond to the 19 gradation levels comprised of the 0th to the eighteenth gradation levels. Although the reference symbols $S_1$ to $S_{18}$ are omitted in FIG. 1, each picture element is constituted by the micro picture elements $S_1$ to $S_{18}$ in the same manner as the picture element in FIG. 4(A). The micro picture element $S_1$ is colored with the lowest threshold, and the micro picture element $S_{18}$ is colored with the highest threshold.

Figure 4A:
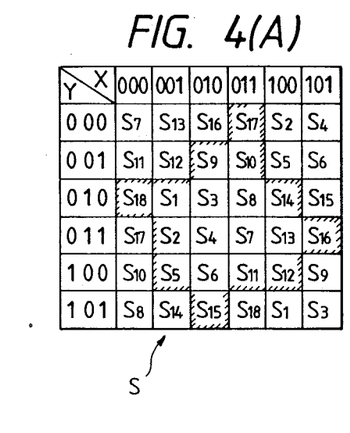
FIG. 4(A) is a diagram illustrating the positional relation between X- and Y-addresses and micro picture elements.

The above-mentioned FIG. 4(A) also illustrates the relation between the micro picture elements $S_1$ to $S_{18}$ and the values X and Y that comprise corresponding XY addresses for specifying the micro picture elements $S_1$ to $S_{18}$.

Figure 4B:
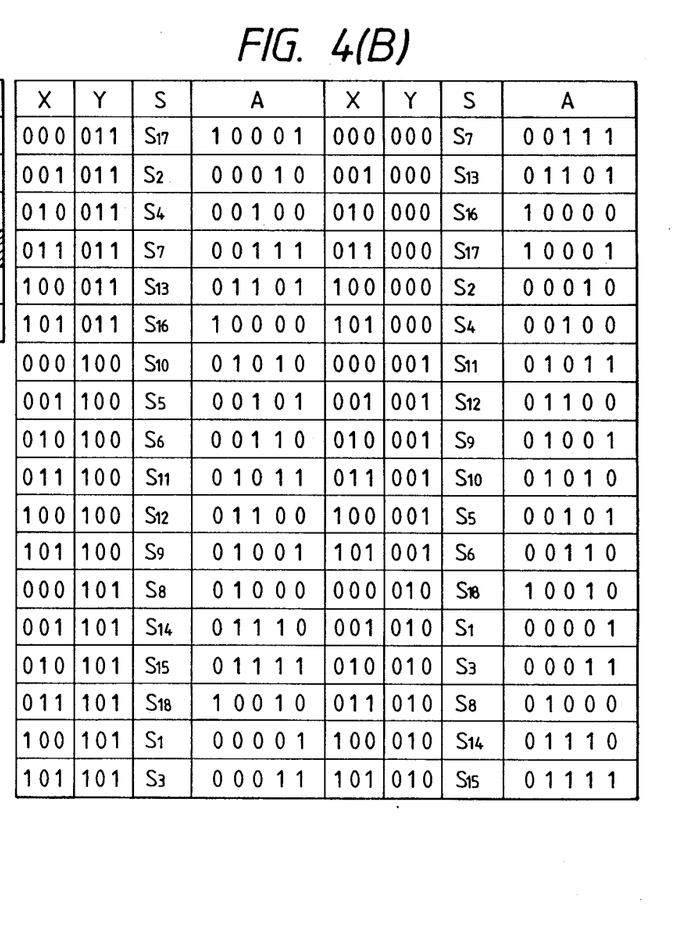
FIG. 4(B) is a diagram illustrating the relation between X- and Y-addresses and threshold data stored in a threshold table.

FIG. 4(B) is a diagram illustrating the relation between the values X and Y of the XY addresses and threshold data A stored in a threshold table 123 as described later. As seen in FIG. 1, the data A stored in the threshold table 123 is set so that the dot for every gradation is formed by a mass of colored micro picture elements and so that the dot does not have two or more protrusion portions each formed of one micro picture element. Moreover, the data A stored in the threshold table 123 is set so that the number of positions where dots adjacent to each other come into point-contact with each other is not larger than two per dot.

Figure 3:
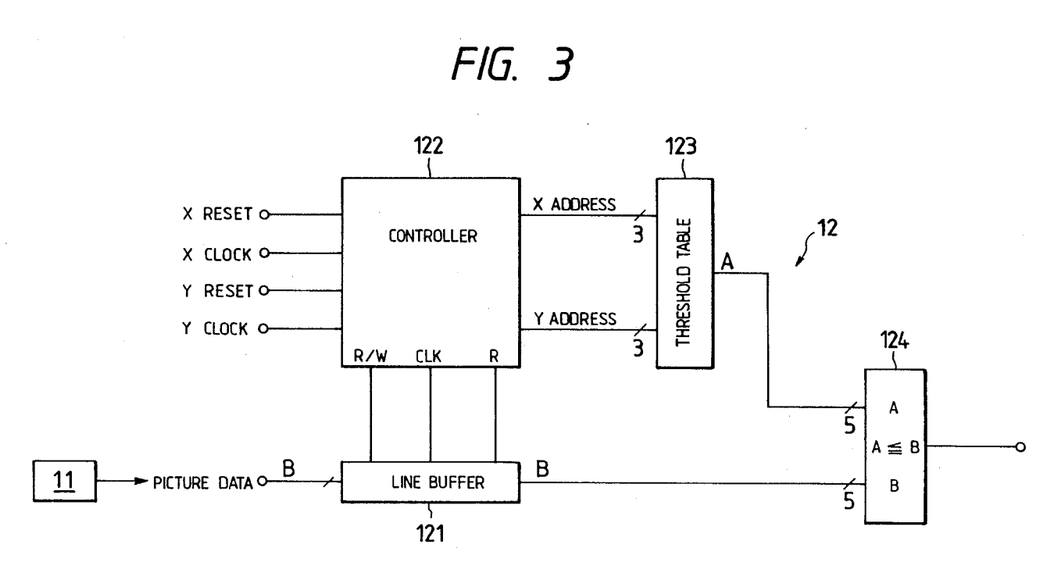
FIG. 3 is a diagram illustrating an embodiment of the arrangement of a picture processing portion in the machine of FIG. 2.

The picture processing portion 12 shown in FIG. 3 is constituted by a so called threshold matrix type screen generator. Picture data B is inputted to the picture processing portion 12 from the above-mentioned picture reading portion 11. The picture data B is composed of signals obtained from an analog-to-digital converter (not shown) that converts analog output signals obtained by a sensor such as a CCD or the like. The converted digital signals are stored in a line buffer 121 in the picture processing portion 12. The picture data B may comprise, for example, a 5-bit data having a value within a range of "00000" to "10010" for causing the display of the 18 gradation levels.

The line buffer 121 is constituted by a shift register or the like to store the picture data B for one line. Since each scanning unit picture element S is constituted by 36 micro picture elements arrayed in a 6×6 matrix and includes twice as many micro picture elements as the micro picture elements $S_1$ to $S_{18}$ constituting a single picture element, the picture data B is read out six times for each line of picture element which is outputted. Reading and writing of the line buffer 121 is controlled by means of a controller 122. The controller 122 is constituted by a counter and so on, and operates on the basis of an X-clock signal that is synchronized with the timing of scanning of the micro picture elements by the laser light 14 (see FIG. 2), and an X-reset signal generated whenever the laser light 14 scans each picture element. A Y-clock signal is generated whenever the above-mentioned drum-like photosensitive body 15 (see FIG. 2) rotates by an angle corresponding to one micro picture element, and a Y-reset signal is generated whenever the photosensitive body 15 rotates by an angle corresponding to four micro picture elements.

Each of the X- and Y-address signals takes a value within a range of from "000" to "101" in accordance with the above-mentioned clock and reset signals to specify each of the micro picture elements arrayed in the 6×6 matrix. The threshold table 123 is constituted by a memory element such as a ROM or the like in which the threshold data A (see FIG. 4(B)) for determining whether the micro picture elements specified by the abovementioned X- and Y-address signals should be colored have been stored so that those threshold data A correspond to the X- and Y-addresses of the respective micro picture elements $S_1$ to $S_{18}$. A comparator 124 compares the threshold data A read from the threshold table 123 with the picture data B read from the line buffer 121, and outputs "1" when the picture data B is equal to or larger than the threshold B (that is, when $A \leq B$) and outputs "0" when $A > B$. The output signal of the comparator 124 is provided to the laser scanner 13 to turn the laser light 14 off when the input signal from the comparator 124 is "1" and to turn the laser light 14 on when the input signal is "0".

The operation of the embodiment of the present invention having the above-mentioned configuration will be further described with reference to FIGS. 1 to 4.

When the picture data B is "00000", no threshold data A that will be $\leq$ the picture data B has been stored as seen in FIG. 4(B). All of the threshold data A for the micro picture elements $S_1$ to $S_{18}$ which have been stored are the picture data B. The output signal of the comparator 124 is therefore "0" while all the micro picture elements $S_7$ to $S_3$ (see FIG. 4(A)) are scanned. Accordingly, all of the micro picture elements $S_1$ to $S_{18}$ of the picture element under consideration are irradiated with the laser light 14 so that the output dot of the picture element has a shape shown as a dot $P_0$ in FIG. 1.

When the picture data B is "00001", as seen in FIG. 4(B), the threshold data $A \leq$ the picture data B have been stored only for the micro picture elements of with X- and Y-address pairs of "001" and "010" and "100" and "101". All other threshold data A for the micro picture elements $S_2$ to $S_{18}$ which have been stored are the picture data B. The output signal of the comparator 124 is therefore "1" only when the micro picture element $S_1$ is scanned and is "0" when the other micro picture elements are scanned. Accordingly, the micro picture elements $S_2$ to $S_{18}$ of the picture element under consideration other than the micro picture element $S_1$ are irradiated with the laser light 14 so that the output of this picture element at this time has a shape as shown in FIG. 1 as a dot $P_1$.

When the picture data B is "00010", as seen in FIG. 4(B), the threshold data $A \leq$ the picture data B have been stored only with respect to the micro picture elements $S_1$ and $S_2$ identified by the X- and Y-address pairs of "001" and "010", "100" and "101", "100" and "000", and "001" and "011". All of the other threshold data A for the stored micro picture elements $S_3$ to $S_{18}$ are $>$ the picture data B. The output signal of the comparator 124 is therefore "1" only when the micro picture elements $S_1$ and $S_2$ are scanned and is "0" when the other micro picture elements are scanned. Accordingly, all of the micro picture elements $S_3$ to $S_{18}$ of the picture element under consideration other than the micro picture elements $S_1$ and $S_2$ are irradiated with the laser light 14 so that the output dot of this picture element has a shape as shown in FIG. 1 as a dot $P_2$.

In the same manner, when the picture data B is "00011", "0100", . . . , and "10010", the output dot of this picture element has such a shape as shown in FIG. 1 as a dot $P_3$, $P_4$, . . . , and $P_{18}$, respectively.

Thus, by means of the threshold table 123 having the data A stored therein as shown in FIG. 4(B), a selected one of the dots $P_0$ to $P_{18}$ can be outputted in accordance with the value of the picture data B to display a corresponding one of the 19 gradation levels.

Although an embodiment of the method of displaying gradation in a picture output apparatus according to the present invention has been described in detail, the, present invention is not to be limited by the above-mentioned embodiment, and various changes and modifications may be made in the present invention without departing from the spirit thereof and the scope of the following claims.

Figure 5:
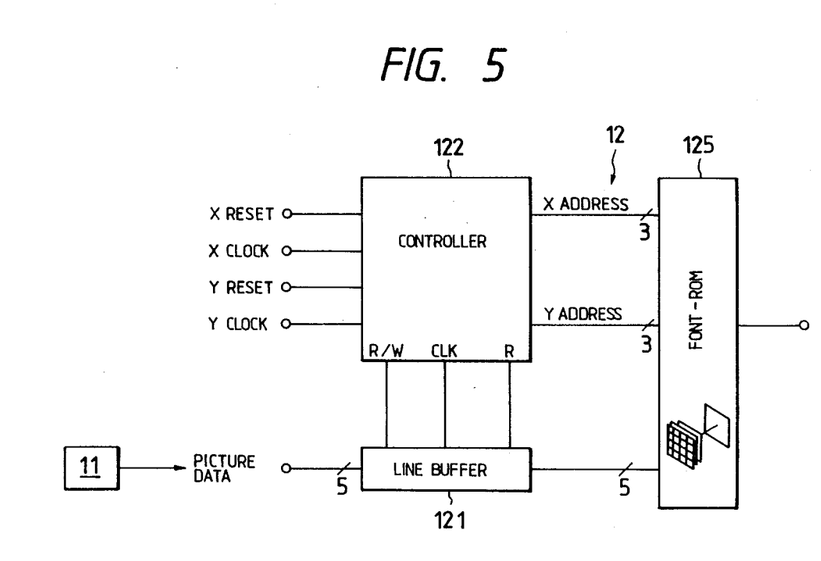
FIG. 5 is a diagram illustrating another embodiment of the arrangement of the picture processing portion.

For example, in displaying a selected one of the 19 kinds of dots $P_0$ to $P_{18}$ shown in FIG. 1, it is possible to use a font type screen generator as shown in FIG. 5 in place of the above-mentioned threshold matrix type screen generator shown in FIG. 3. In this case, the picture processing portion 12 may use a font memory 125 shown in FIG. 5, in place of the threshold table 123 and the comparator 124 shown in FIG. 3. The 19 types of dots $P_0$ to $P_{18}$ are stored in this font memory 125 in a manner corresponding to the respective gradation levels shown in FIG. 1. At this time, "1" and "0" are stored for colored and a non-colored micro picture element, respectively. For example, "0" is stored for all of the micro picture elements $S_1$ to $S_{18}$ with respect to the first gradation level, "1" is stored for the micro picture element $S_2$ to $S_{18}$. With respect to the second gradation level, "1" is stored for the micro picture elements $S_1$ and $S_2$ while "0" is stored for the other micro picture elements $S_3$ to $S_{18}$, . . . . With respect to the eighteenth gradation level, "1" is stored for all of the micro picture elements $S_1$ to $S_{18}$. The X- and Y-address signals and the picture data B are respectively outputted by the controller 122 and the line buffer 121 as an address into the font memory 125, which has the data of dots stored therein in the manner described above. The dots $P_0$ to $P_{18}$ are selectively identified by the picture data B, and the micro picture elements $S_1$ to $S_{18}$ are selectively identified by the X- and Y-address signals so that it is possible to output a dot for a gradation level corresponding to the picture data B.

Although it has been described in the above-mentioned embodiment that each picture element is constituted by 18 micro picture elements $S_1$ to $S_{18}$ and formed with a screen angle 45° so as to display selectively one of 19 gradation levels, it is possible to perform display with respect to many other numbers of gradation levels, many other numbers of micro picture elements, and may other screen angles. In that case, it may be suitable to use a configuration of a bit-number corresponding to those numbers. Further, the number of bits may be set to eight to enable general-purpose configurations to be easily used as long as the required number of upper or lower significant bits may be used. Moreover, micro picture elements constituting each picture element may be formed in a square or rectangular matrix, or in many other shapes.

Although the case of monochrome display has been described in the above-mentioned embodiment, it is also possible to apply the invention to color display for every color. Although an example of the application of the invention to a digital copying machine has been described, it is also possible to apply the invention to a laser printer.

As has been described above, in the method of displaying gradation in a picture output apparatus according to the present invention, the number of points of point-contact between dots adjacent to each other is limited to be not larger than two per dot. Consequently, each dot has fewer unstable portions to be reproduced and the increased stability improves the picture quality.

What is claimed is:

1. In a picture display method wherein a picture is reproduced as a plurality of contiguous dots and each dot is represented by a corresponding picture element having a small area and each of the picture elements is further divided into micro picture elements each having a micro area and wherein a dot is printed as a selected one of a plurality of different gradations wherein each gradation is represented by coloring selected ones of the micro picture elements of the picture element corresponding to the dot, the improvement comprising the step of predetermining for every possible gradation of a picture element a pattern of micro picture elements to be colored wherein the number of colored micro picture elements of contiguous picture elements that are in point-contact with each other is not larger than two.

2. A picture display method wherein a picture signal is reproduced as a picture image comprising a plurality of contiguous dots wherein each dot is represented by a corresponding picture element having a small area and each of the picture elements is further divided into micro picture elements each having a micro area and wherein a dot is printed as a selected one of a plurality of different gradations wherein each gradation is represented by coloring selected ones of the micro picture elements of the picture element corresponding to the dot, the method comprising the steps of:

converting the picture signal into a corresponding set of digital picture signals, each of said digital picture signals having a value indicating an image intensity;

storing for every possible gradation of a picture element a pattern of micro picture elements to be colored wherein the number of colored micro picture elements of contiguous elements that are in point-contact with each other is not larger than two;

selecting for each of said digital picture signals a gradation corresponding to the image intensity value thereof; and forming on a recording medium a dot for each of said selected gradations to form a representation of the picture signal.

* * * * *